United States Patent [11] 3,588,911

[72] Inventors Robert R. Luke
Houston;
Marshall M. Robinson, Sugar Land;
Kenneth Thomson, Pasadena, all of Tex.
[21] Appl. No. 700,197
[22] Filed Jan. 24, 1968
[45] Patented June 28, 1971
[73] Assignee Shell Oil Company
New York, N.Y.

[54] DISPLAY SYSTEM FOR SEISMIC DATA
5 Claims, 4 Drawing Figs.
[52] U.S. Cl. .................................................. 346/74,
340/15.5, 346/33, 346/110, 355/2
[51] Int. Cl. ....................................................... G01d 15/06,
G01d 9/12, G01v 1/24
[50] Field of Search ........................................... 346/74 (P),
(CRT), (ES), (ESX), (ESB), 33 (Seis.), 110;
355/2 (Inquired); 179/100.2 (CRT); 178/6.6
(Inquired); 340/15.5 (Display)

[56] References Cited
UNITED STATES PATENTS
2,976,107  3/1961  Klein et al. ................... 346/33X
3,025,123  3/1962  Klein ............................ 346/33X
3,158,433  11/1964  Alexander et al. ............ 346/33X Primary Examiner—Bernard Konick
Assistant Examiner—Gary M. Hoffman
Attorneys—Theodore E. Bieber and J. H. McCarthy ABSTRACT: A display system for producing a visual record of electrically recorded seismic data using a photoconductive medium. The system uses a cathode-ray tube to convert the electrical signals to visible light for writing the seismic data on the photoconductive medium. The system includes means for spatially limiting the electrostatic charging of the photoconductive medium prior to writing the signals on the photoconductive medium. The system also includes a means for developing the charge patterns in a liquid bath such that rapid access is attained, allowing online inspection of the processed data.

INVENTORS:
R. R. LUKE
M. M. ROBINSON
K. THOMSON

BY: *Theodore E. Bieber*

THEIR ATTORNEY

INVENTORS:
R.R. LUKE
M.M. ROBINSON
K. THOMSON
BY: Theodore E. Bieber
THEIR ATTORNEY

DISPLAY SYSTEM FOR SEISMIC DATA

Background of the Invention

One of the basic tools used in the exploration of the earth for possible petroleum deposits is seismic exploration. In seismic exploration an acoustic impulse is generated either by a chemical explosive, dropping of weights or other means. The acoustic impulse travels through the earth and is reflected from various interfaces in the formation and the reflections are received by geophones that are placed at the surface in a predetermined pattern. The geophones transform the received reflections into related electrical signals that are then recorded either in digital form or in analog form. The recorded seismic signals or data are transmitted to a processing station where the data are converted to a visual form that can be used by geologists in determining the possibility of petroleum deposits being present.

At a processing center the seismic data are filtered to improve the signal-to-noise ratio and the individual signals are corrected for move out and other abnormalities. The data may be processed either in an analog form or in a digital computer or in a combination of analog and digital systems. In either case, the processed seismic data exist only in a digital computer memory or in the form of an analog signal. In contrast, the geologist requires a visual presentation in order to interpret the data and decide on the possibilitiy of petroleum deposits being present. Thus, the problem is presented of transforming the data into a visual presentation while preserving all the accuracy present in the original data.

Over the years the visual presentation of seismic data has become standardized. For example, the time scale varies between 2 inches per second to 12 inches per second. Since the total amount of recorded time in reflection seismic work runs to 7½ seconds, this requires a record between 15 and 84 inches long. Normally a record 42 inches long has been used to display 7½ seconds of recorded time. Further, the method of recording is normally a variable area recording although some seismic data are visually recorded in the form of the single-trace or wiggle-type of signal. Finally the record should have printed thereon the recording data blocks indicating the location where the data was obtained and other information needed in interpreting the records.

A further requirement for visual presentation of data is a rapid printout of the data. This is especially important in the case of digital computer processing of data since the computer supplies one complete seismic section approximately every minute on the average. The seismic record usually corresponds to 24 geophones spaced in a predetermined pattern and the seismic section is made by playing out these 24 trace record blocks side-by-side. Thus, it is seen that if it is possible to print out or transform the processed data to a visual presentation faster than real time, a single display system can be used.

A further consideration in the transforming of seismic data to visual presentation is the cost of the transformation. In view of the large amount of data that are presently being processed, even a small savings in the unit coast results in a large overall saving. In the past it has been customary to play out the data on photographic film and then develop the film and make the required prints. This, however, has two distinct disadvantages. Photographic film is expensive and does not lend itself to rapid access or online development. The latter can be very important in digital computer processing, in that in the event of a malfunction, either human or machine, the situation may be detected much sooner if the processed data are rendered visible sooner.

Summary of the Invention

The present invention solves the above problems by providing a display or play-out system for transforming processed seismic data to a visual presentation using photoconductive paper. Photoconductive paper has come into wide use in recent years in document copiers and other duplicating equipment and has become a low cost recording medium. More particularly, the present invention uses a paper which may be electrostatically charged and then selectively discharged upon exposure to visible light. The paper is then passed through a developer wherein toner particles adhere to the exposed areas to create a visual image of the processed seismic data. The system uses a cathode-ray tube and associated circuits to convert processed data to a visual light form that can be used to discharge selected areas of the electrostatically charged paper. The circuits associated with the cathode-ray tube are designed to sample the processed data at fixed intervals and display the resulting magnitude of the signals on the face of the cathode-ray tube. The cathode-ray tube is designed to sample the 24 traces of a seismic record at frequent intervals and print out a complete seismic record during a single traverse of the tube across the paper.

The system mounts the photoconductive paper in a flat plane with the cathode-ray tube being mounted on a movable carriage. The carriage is driven across the plane of the paper at a constant speed to generate the time or depth axis of the plotted data. The rate at which the data are fed to the cathode determines the actual scale. Thus, the actual length of the record can be controlled by the seismic processing system and varied to suit different conditions. The system also includes a corona charger mounted on the carriage for electrostatically charging paper immediately ahead of the cathode-ray tube. The corona charger is provided with a variable mask to limit the electrostatic charging of the paper to the exact width that will be exposed by the cathode-ray tube. This width also corresponds to the amount by which the paper is indexed after each record is printed. Thus, all of the section receives the same electrostatic charge and a uniform section is generated.

Brief Description of the Drawings

The above advantages and operation of the display system of this invention will be more easily understood from the following detailed descriptions of preferred embodiments when taken in conjunction with the attached drawings in which.

Description of Preferred Embodiments

As explained above, a major requirement for the display system is that it rapidly plays out the processed seismic data. In order to achieve the required speed of play out it is obvious that substantially all manual operations should be eliminated and the equipment automatically controlled. If this combination can be achieved while at the same time achieving reliability of operation, it is possible to provide a rapid play out.

Figure 1:
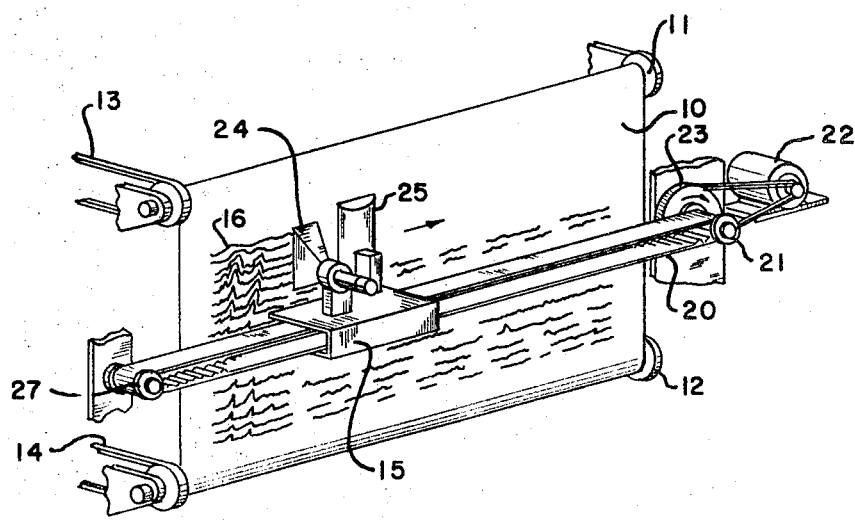
FIG. 1 simplified perspective drawing of the monitoring system.

Referring now to FIG. 1 there is shown a simplified perspective view of the display system of this invention. The display system uses a photoconductive paper 10 for forming the visual presentation. The photoconductive paper 10 is preferably a paper which can be electrostatically charged and then discharged in selected areas that are subsequently coated with a pigmented toner to develop a visual presentation or image of the seismic data. To achieve the required speed and automatic operation the paper 10 is preferably mounted on large rolls, thus eliminating the time required to change the paper after each seismic section is printed. The paper is supplied on a reel 11 and taken up on a reel 12 with the reels 11 and 12 being mounted on a suitable framework, not shown in FIG. 1. In addition, the take up reel 12 should be provided with a suitable drive means that is controlled by the seismic data processing system in order that it may be intermittently operated to present a new portion of the paper after each recording. The portion of the paper 10 on which the seismic data are recorded is maintained in a relatively flat uniform plane, at least between the limits shown by the upper line 13 and the lower line 14.

The seismic data are transferred to the paper by means of a cathode-ray tube 24 that is mounted on a movable carriage 15. The carriage 15 is driven in a direction normal to the advance of the paper 10. While the carriage is traveling across the paper to play out the processed seismic data, the paper 10 is maintained stationary. During the return of the carriage 15 to its starting position the paper 10 is advanced to present a fresh portion of the paper for recording the next record of seismic data. The carriage 15 may be driven by means of an endless geared belt 20 and a belt-seizing mechanism, not shown in FIG. 1. The belt-seizing mechanism selects one side of the belt to cause the carriage to travel in one direction and the opposite side of the belt to cause the carriage to travel in the reverse direction. Thus, the belt 20 can be driven in a single direction at a speed that is related to the time axis of the seismic data. When the term "time axis" is used, it refers both to the time base of the original seismic recording as well as the corrected time or depth base of the processed record. Since the velocity of sound normally increases with the depth of burial, real time cannot be related directly to depth of burial, but corrections must be made. The conversion of the time base to a depth base is performed during the processing of the seismic records.

The endless belt 20 is driven by a motor 22 through a speed reduction 23 and drive sheave 21 while the other end of the belt is supported by an idler pulley 27. While the speed reduction is shown as a simple belt drive, obviously more sophisticated variable-speed drives can be incorporated. The drive motor 22 is preferably a servomotor that can be controlled by the seismic data processing system or the speed reduction may be controllable. This will then permit adjustment of the horizontal or time axis of the recorded data to any desired degree to obtain the desired length of record. Normally, for reflection work on land the original recording is approximately 7½ seconds long in real time. At a 5 to 1 scale the paper 10 should be approximately 42 inches wide to provide a 40-inch record. The speed control of the motor 22 by the seismic processing system can be used to provide time depth corrections during the actual playout of the process seismic data. This would require the seismic processing system be programmed so that it will supply a control signal suitable for controlling the servomotor 22 or speed reduction.

Figure 2:
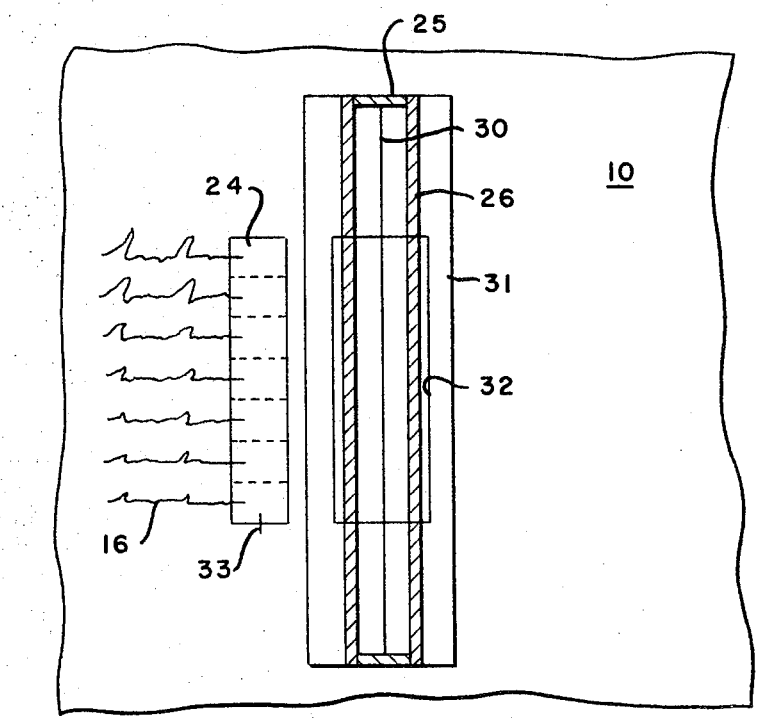
FIG. 2 is a partial plan view of the cathode-ray tube and corona charger of this invention.

Referring to FIG. 2, there is shown a simplified top view of the display system. The face of the cathode-ray tube 24 is preferably of a rectangular shape and its sweep is controlled as explained below so that the 24 traces of a seismic section will be written in a single traverse of the carriage 15. Positioned adjacent to the cathode-ray tube 24 is the corona charger 25 that consists of a suitable housing 26 having a thin metallic strip 30 with a serrated edge to produce a number of sharp points mounted therein. The strip 30 is coupled to a high-voltage power supply, for example, 10 kilovolts, that effectively ionizes the atmosphere around the sharp points 30. The ionized atmosphere will create an avalanche of oxygen ions which will then electrostatically charge the paper 10 immediately ahead of the cathode-ray tube 24. The corona charger is provided with a mask 31 having a variable opening 32. The length of the opening 32 is adjusted so that it corresponds substantially to the width of the 24 traces being recorded by the cathode-ray tube. The use of the mask 31 is an important feature of the invention, since it limits the area of the paper 10 that is electrostatically charged to the exact area required for the 24 traces. Thus, there is no overlap between the adjacent recordings on the record and a uniform section is recorded. The length of the opening 32 can be adjusted by various means, for example, by cam means or stepper motor means. The length of the opening 32 can also be manually adjusted. Likewise, a fine wire can be used in place of the thin metal strip 30 in the corona charger.

Figure 3:
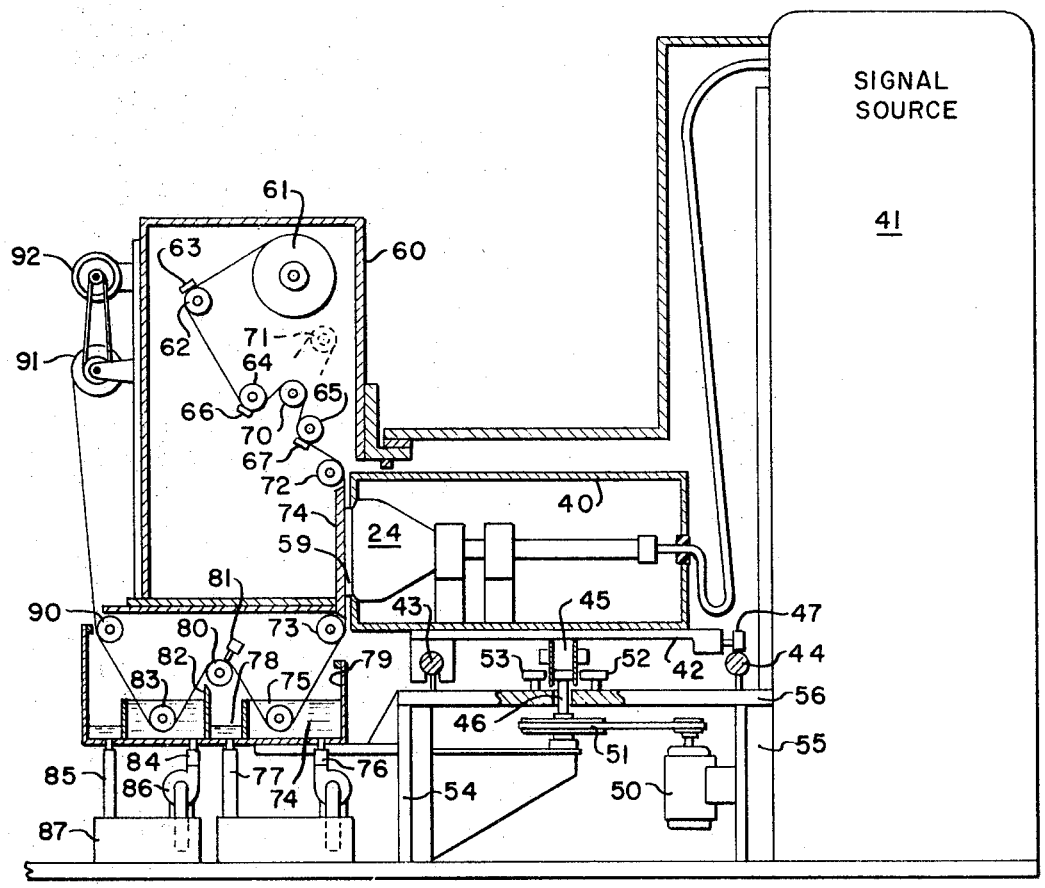
FIG. 3 shows an end view of a modified carriage including a simplified drive means for the carriage.

Referring now to FIG. 3, there is shown an end view of a complete display system constructed according to this invention. More particularly, there is shown a carriage 40 on which the cathode-ray tube 24 is mounted in addition to the corona charging means. The cathode-ray tube is connected by a long lead to a signal system 41 shown in FIG. 4 and fully described below. The carriage is provided with a base member 42 that rides on two tubular guides 43 and 44. Suitable antifriction bearings are provided for supporting the carriage 40 on the tubular guides, as for example, ball bearing supports 47.

The carriage is driven along the tubular guides by means of a drive capstan 46 that engages one sidewall of a tubular channel-shaped member 45 that extends downwardly from the base carriage. The channel-shaped member may be formed of a center section and thin sidewalls that are attached to the center section. The use of thin sidewalls is preferred, since they will absorb some misalignment of the drive means. The drive capstan is driven by means of a motor 50 and a belt and pulley arrangement 51. Idler wheels 52 and 53 are positioned on opposite sides of the channel-shaped member 45 to backup the thin sidewalls and insure a driving contact between the drive capstan and the sidewalls. Positioning means (not shown) are used to move the drive capstan from a driving engagement with one sidewall to a driving engagement with the opposite sidewall. This will permit driving the carriage in either direction. In addition, a compression spring may be placed at the end of the guides to stop the carriage and reverse its direction. The carriage has considerable weight and requires considerable energy to stop and reverse its direction. Thus, the compression spring will absorb energy as it stops the carriage and supply energy as it reverses the direction of the carriage.

The tubular guides are supported from a base member 56 that in turn is mounted on two channel-shaped members 54 and 55. The channel-shaped members are secured to the main frame of the display system, not shown in FIG. 3. The unexposed paper is stored in a lighttight magazine 60 which is secured in a lighttight manner to the main frame of the display system. The paper supply roll 61 is mounted on a suitable chassis and a web of paper fed through the idler roll 62. The idler roll 62 is provided with a friction brake 63 for preventing excess paper from being pulled from the paper supply roll. The web then passes over idler rolls 64 and 65 having releasable clamping members 66 and 67 that are capable of firmly clamping the web to the idler rolls. Positioned between the idler rolls 64 and 65 is a metering roller 70 that travels between the position shown and a dotted position 71. The combination of the idler rolls and the metering roller provides a means by which a fixed amount of paper may be intermittently advanced by controlling the releasing of the clamp members and the movement of the metering roll between the two positions.

The record advancing elements include adjustable means for changing the length of paper that is advanced to correspond with the adjustments in the length of the opening in the mask covering the corona charger. The clamp 66 and its associated roller, the clamp 67 and its associated roller 65 and the movable roller 70, constitute a linear differential. In operation, clamp 67 is energized, clamp 66 is released, and movable roller 70 moves upward from its reference position against a fixed stop toward an adjustable stop, shown as 71 in the figure. As it moves it pulls paper from the roll 61. When the movable roller has reached the adjustable stop at position 71, clamp 66 is reenergized, and the movable roller 70 returns downward to its fixed stop, leaving a loop of paper between clamps 66 and 67. At the completion of writing and on the return stroke of the writing carriage, clamp 67 is released, which allows the takeup motor to pull out the loop of paper. The adjustable stop for roller 70 is a variable radius cam. When changes are made in the length of the opening 32 in the mask 31 over corona charger 25, corresponding changes are made in the position of the adjustable stop for roller 70. The later changes can be made manually or by automatic means having actuating elements responsive to changes in the corona charger window.

The paper web then passes over two idler rolls 72 and 73 that are positioned above and below an opening 59 formed in the mask member of the display system. The paper passes over the backing member 74 which serves to support the paper in a relatively flat plane. As explained above, the carriage includes a means for electrostatically charging the paper only in the area in which it will be exposed.

After the seismic data is written on the paper, it passes over idler rolls 73 and 75 into a tank 79 of developer. The tank 74 is supplied with developer through a line 76 while the excess developer which overflows the tank or drains from the paper is drained from the space 78 by means of a drain hose 77. The developer consists of a suspension of charged pigmented toner particles in a liquid. The toner particles are charged with the same polarity as the paper so that they are repelled by the unexposed areas of the paper. After the paper passes through the developer, it passes over idler roll 80 that is provided with a squeegee type wiper 81. The wiper removes the excess liquid from the paper web with the liquid returning to the volume 78 where it can be drained and recirculated to the developer tank. The wiper 81 may be electrostatically charged to assist in removing toner particles from the portions of the record that are intended to be unmarked. If the wiper is charged with the same polarity as the toner particles, the toner particles will be repelled by the wiper and removed from the paper.

After the excess liquid is removed from the paper web, it passes over a roller 83 disposed in a tank of fluid 82. The paper web after passing over the roller 83 passes over an idler roller 90 to takeup roller 91. The takeup roller 91 is driven by motor means 92 with the drive means being capable of slipping when the paper is held stationary and taking up the slack when the paper is released. The liquid in the tank 82 is supplied by a line 84 with the excess being drained through a line 85 to a supply tank 87. The fluid in the supply tank 87 is circulated by means of pump 86 to the tank 82.

An alternate arrangement to the above-described developing system would be the use of a spray head to apply the developer to the exposed paper. The developer can be sprayed as a single solution or the two-part system described above may be used. With either system the spray head should be mounted adjacent the paper web and preferably where it passes over a roller. For example, the spray head could be mounted in tank 79 adjacent the paper web where it passes over roller 75. The excess liquid will then drain into the tank 79 and be returned to the storage tank.

The developer in the above system can be any commercially available developer using a liquid having a relatively high boiling point, as for example, kerosene. The use of a liquid having a high boiling point prevents an undue evaporation of the liquid and thus results in a more uniform mixture of the toner particles and the liquid. This produces more uniform records and prevents an undue concentration of the toner particles in the developer solution. In order to secure the fast air drying characteristic necessary in a continuous developing process, the developed web is passed through the liquid in the tank 82 which liquid is a relatively low-boiling point liquid, as for example, Freon 113. Thus, Freon 113 mixes with any liquid developer that remains on the paper web and causes the liquid to be evaporated with the Freon 113. This thus provides the rapid drying characteristic necessary in any continuous process, while maintaining a uniform developer solution. Since the Freon 113 is separate from the liquid developer, evaporation of the Freon 113 will not result in an increased concentration of developing particles in the developing tank. Thus, the overall quality of the record is greatly improved.

As explained above, the cathode-ray tube 24 is swept in only one direction with the Z-axis or beam being brightened at appropriate times. Thus, if the sweep of the beam is repeated at a relatively rapid rate when compared with the forward advance of the carriage 15 the resulting image will appear as a continuous seismic trace. In order to obtain a variable area record the Z-axis or beam brightening will, of course, be on for a finite time and then turned off. This will provide a variable-area record, while if the beam was merely turned off and on, it would provide a trace or what is referred to as a "wiggle" record.

A conventional cathode-ray tube having a phosphor screen face plate may be used. In place of a conventional cathode-ray tube a tube wherein the phosphor screen is coupled to paper 10 by means of an optical system, as for example, fiber optics, is preferred. This type of tube eliminates the tendency of the light to spread as it passes through the conventional glass envelope. In one satisfactory system an 8-inch cathode-ray tube was used and swept at a rate of 4,000 Hz. At this sweep rate the data of each trace will, in a 24-trace seismic record, be sampled every 250 microseconds. The normal frequency range of seismic signals is 20 to 100 Hz. This will insure a continuous trace that will maintain the fidelity and accuracy of the seismic processing system.

Figure 4:
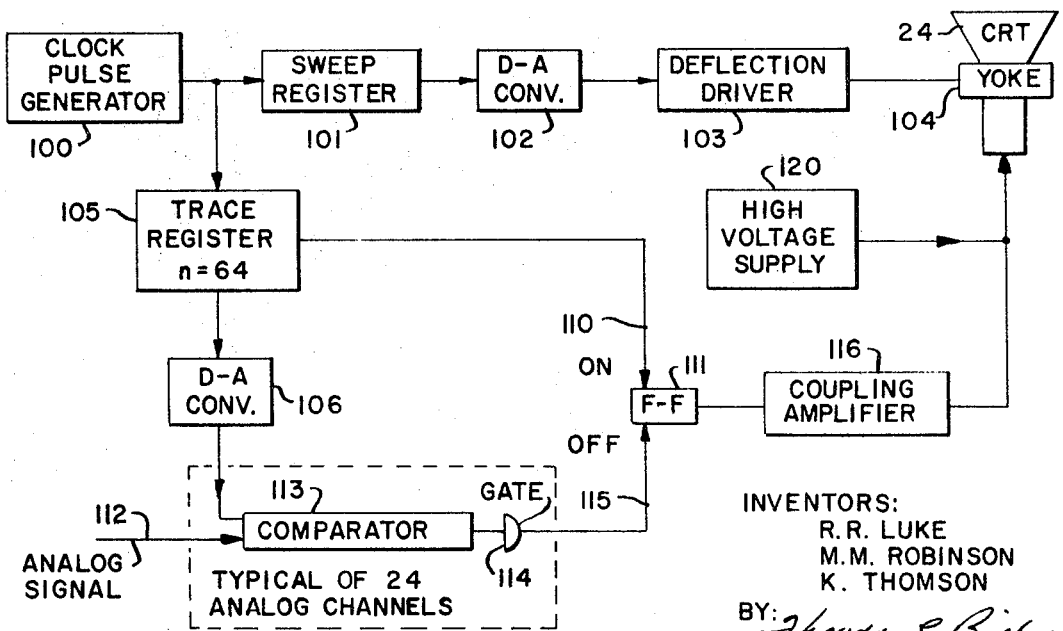
FIG. 4 is a block diagram of the circuit for controlling the cathode-ray tube.

Referring now to FIG. 4, there is shown a block diagram of the circuit for controlling the sweep of the cathode-ray tube 24 and in addition actuating the Z-axis or beam brightening. To minimize the drift problems the sweep signal of the cathode-ray tube is generated by a digital system and more particularly a clock pulse generator 100. This is a free-running oscillator whose frequency is accurately controlled as by means of a crystal. The output of the clock generator is coupled to both a sweep register 101 and a trace register 105, both circuits being basically counting circuits. The sweep register is designed so that it requires 64 clock pulses to carry the cathode-ray tube beam across the space allotted to each trace. Thus, the sweep register will be required to count to a total of 1536 pulses. The sweep register is coupled to a digital-to-analog converter 102 that converts the output to an analog signal. The analog signal from the circuit 102 is supplied to the deflection driving circuit 103 which in turn controls the voltage supplied to the deflection yoke 104 of the cathode-ray tube. Thus, the deflection circuit will cause the beam to sweep across the face of the cathode-ray tube at a rate controlled by the clock pulse generator. This circuit will inherently provide greater accuracy than is possible with the conventional sweep circuit wherein the ramp voltage is generated in a conventional oscillator circuit.

Simultaneously with the advance of the sweep circuits the trace register also accumulates the pulses from the clock generator. The trace register supplies a start or on signal to the on connection of a flip-flop 111. This signal is supplied at the start of each individual count of 64 pulses. The output of the trace register is also supplied to a digital-to-analog converter 106 which converts the instantaneous count to a related analog signal. The analog signal is supplied to a comparing circuit 113 which also receives an analog signal representing the amplitude of the seismic trace at any particular instant of time. The comparing circuit 113 compares the amplitude of the seismic trace with the amplitude of the signal from the trace register. When the amplitude of the two signals agree the comparing circuit opens the gate 114, turning off the flip-flop.

The signal from the flip-flop is passed to a coupling amplifier 116 that in turn controls the Z-axis or beam brightening sweep of the cathode-ray tube. The beam brightening voltage is supplied from a high voltage supply 120.

When the above circuit is operated, it is seen that at the start of a recording cycle the clock pulse generator will control the beam of the cathode ray tube at a sweep rate of 4,000 cycles per second. In addition, the clock pulse generator will divide the sweep up into 1536 increments so that each trace will consist of 64 individual increments. The pulses from the clock generator also control the beam brightening circuit. This is achieved by turning on the beam brightening by means of the flip-flop at the start of the portion of the beam sweep allotted to each individual trace. Thus, the beam brightening circuit will be on until the amplitude of the signal from the trace register 105 equals the amplitude of the seismic trace. This will thus supply a variable-area record of the seismic trace.

From the above description it can be seen that the individual seismic traces will be recorded with an accuracy of 1 part in 64, or an accuracy of 1.5 percent. Of course, each trace to be recorded will require its own individual comparing and gate circuit to enable it to print the trace at the proper time of the sweep of the oscilloscope. Thus, each gate can only be opened for a maximum of one twenty-fourth of the complete sweep of the cathode-ray tube.

A wiggle or single trace line record can be produced by intensifying the beam momentarily as each comparator circuit delivers its comparison pulse. This can be accomplished by reversing the leads to the flip-flop so that it is normally turned off by the trace register and only turned on for an instant when the comparator circuit delivers its comparison pulse. When wiggle records are recorded, four overlapping sweep registers can be used with each trace register to enable it for one-sixth of the time of the sweep register. Thus, one can record overlapping wiggle traces four times as large as the trace height when variable-area records are made. This is, of course, the normal seismic recording procedure in the case of wiggle traces, since an overlapping of signals that are in phase tends to amplify or accentuate the signals, while out-of-phase or noise signals will be attenuated and decrease in intensity.

We claim:

1. A system for converting machine-processed seismic data to graphic form, said system comprising:

a frame member;

a photoconductive sheet in the form of a continuous roll;

means for supporting said photoconductive sheet in a flat plane on said frame member;

carriage means movably mounted on said frame member in a plane parallel to said photoconductive sheet;

a cathode-ray tube having deflection and beam brightness circuitry;

means for mounting said cathode-ray tube on said carriage means adjacent said photoconductive sheet with the face of said cathode-ray tube substantially parallel to the plane of said photoconductive sheet;

a corona charging means, said corona charging means being mounted on said carriage means;

a drive means, said drive means being coupled to said carriage means to drive it in a first direction at a constant speed to generate the time of depth axis of the seismic data and in a second direction to return said carriage to its initial position;

means for advancing said roll intermittently in response to said drive means moving said carriage in said second direction; and, control means connected to said cathode-ray tube, said control means including:

1. a source of clock pulses;
2. a first digital counting means connected to said source of clock pulses;
3. first digital to analog converter having the input thereof connected to the output of said first digital counting means and the output thereof connected to the deflection circuitry of said cathode-ray tube whereby the beam of the cathode-ray tube is caused to sweep across the tube at a rate controlled by said source of clock pulses,
4. a second digital counting means connected to said source of clock pulses,
5. a second digital to analog converter means connected to said second digital counting means,
6. means for comparing the output of said second digital to analog converter with the amplitude of the seismic data signal and supplying an on/off control signal to the beam brightness circuitry of said cathode-ray tube when the output of said digital to analog converter is substantially equal to said seismic data signal.

2. The system of claim 1 wherein said carriage travels in a direction normal to the direction of advance of the photoconductive sheet.

3. The system of claim 1 wherein a mask is mounted between said corona charger and said photoconductive sheet, said mask limiting the portion of the sheet being electrostatically charged to the area exposed by said cathode-ray tube.

4. The system of claim 1 and in addition a developing means including means for contacting the photoconductive sheet with a high-boiling-point suspension of toner particles and then with a relatively low-boiling-point liquid that is miscible with the suspended liquid.

5. The system of claim 1 and in addition an energy absorbing means disposed to absorb the energy of the carriage traveling in one direction and return the absorbed energy to the carriage when the carriage reverses its direction of travel.